(12) United States Patent
Kawai

(10) Patent No.: US 7,110,441 B2
(45) Date of Patent: Sep. 19, 2006

(54) SPREADING CODE GENERATION CIRCUIT AND DEMODULATION CIRCUIT

(75) Inventor: Hisashi Kawai, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 931 days.

(21) Appl. No.: 10/151,148

(22) Filed: May 21, 2002

(65) Prior Publication Data

US 2002/0186754 A1 Dec. 12, 2002

(30) Foreign Application Priority Data

Jun. 7, 2001 (JP) ............................ P2001-173095

(51) Int. Cl.
*H04B 1/707* (2006.01)
*H04B 7/216* (2006.01)
*H04B 7/212* (2006.01)

(52) U.S. Cl. ........................ 375/149; 370/342; 370/347

(58) Field of Classification Search ................ 375/130, 375/140, 145, 147, 149; 370/335, 342, 441, 370/442, 347, 337, 503
See application file for complete search history.

(56) References Cited

U.S. PATENT DOCUMENTS

| | | | | |
|---|---|---|---|---|
| 5,459,763 A * | 10/1995 | Hori et al. | .................... | 375/354 |
| 5,610,940 A * | 3/1997 | Durrant et al. | ............. | 375/150 |
| 5,960,028 A * | 9/1999 | Okamoto et al. | ............ | 375/130 |
| 2001/0024474 A1* | 9/2001 | Rakib et al. | ................. | 375/259 |
| 2002/0034215 A1* | 3/2002 | Inoue et al. | ................. | 375/147 |

* cited by examiner

*Primary Examiner*—Tesfaldet Bocure
*Assistant Examiner*—Vineeta Panwalkar
(74) *Attorney, Agent, or Firm*—Jacobson Holman PLLC

(57) ABSTRACT

The present invention provides a spreading code generation circuit and demodulation circuit capable of maintaining reception characteristic of a receiver in a preferable condition, and a grand phase control in a short time, and eliminating necessity of monitoring the phase control amount.

According to a plurality of types of control signals output according to change of synchronization timing of the reception base band signal, a spreading code generation circuit performs phase control on sample time or symbol time or slot time basis for generating a spreading code.

14 Claims, 9 Drawing Sheets

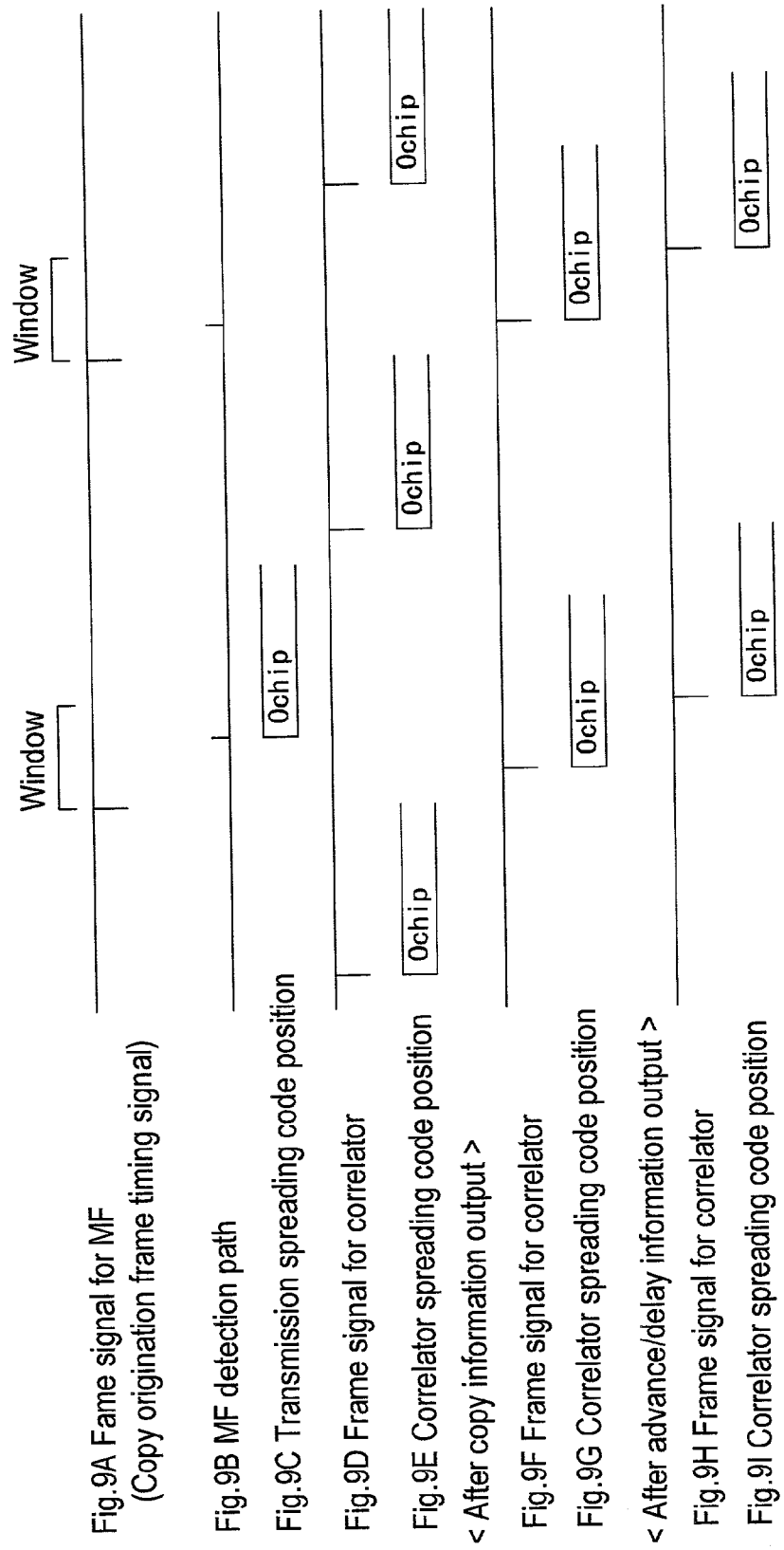

SPREADING CODE GENERATION CIRCUIT AND DEMODULATION CIRCUIT

BACKGROUND OF THE INVENTION

1. Field of the Invention

The present invention relates to a spreading code generation circuit used in a receiver of a spectrum spreading communication and in particular, to a spreading code generation circuit performing phase control by detecting a spreading code generation timing from a received signal which has been subjected to spreading modulation by the direct spreading method upon transmission.

2. Description of the Related Art

In the spectrum spreading communication method used in the mobile body communication or LAN (local area network), when transmitting data, a transmitter performs two-stage modulation to the data: narrow band modulation (primary modulation) and spreading modulation (secondary modulation).

For this, upon reception of data transmitted by radio waves, a receiver firstly performs despreading to the data so as to be returned to the primary modulation state and then a detector circuit reproduces a base band signal. That is, in the receiver, the received data is demodulated in two stages corresponding to the two-stage modulation in the transmitter.

In the aforementioned spectrum spreading communication method, the transmitter performs spreading modulation using a spreading code and the receiver performs despreading using the same spreading code as is used in the spreading modulation.

Special attention is paid on the W-CDMA (wideband code division multiple access) communication method by the spectrum spreading as the mobile body communication method of the next generation. A mobile stations communicating by the W-CDMA communication method starts communication with a base station by performing correlation processing a plurality of types of communication signals transmitted from the base stations, thereby detecting a spreading code to be used in demodulation of the data received from the base station.

Hereinafter, explanation will be given on the spreading code detection method in the spectrum spreading communication method through an example of the W-CDMA communication method.

In the W-CDMA communication method, the spreading code is detected in three stages. When a power is turned on in a mobile station, in order to identify a base station to be communicated, firstly, P-SCH (primary synchronization channel) is caught. The mobile station receives an analog radio signal by an antenna and converts it into a digital signal. By using a spreading code stored in advance, the digital signal is subjected to a despreading processing, so as to detect P-SCH correlation.

The P-SCH is transmitted by one symbol per one slot. The mobile stations detects the analog radio signal synchronization symbol timing by detecting the P-SCH.

Next, as the second stage, the mobile station catches the S-SCH (secondary synchronization channel). When the mobile station receives an analog radio signal by an antenna, the mobile station converts the signal into a digital signal and performs despreading processing to the signal by using a spreading code stored in advance, thereby detecting S-SCH correlation.

The S-SCH is transmitted in parallel to the P-SCH and mobile station catches the S-SCH at the timing of the synchronization symbol detected at the first stage. Moreover, the S-SCH represents a group of spreading codes used for modulation in the base station and in the second stage, the mobile station can detect the spreading code group.

After the S-SCH is detected at the second stage, the mobile station receives a CPICH (common pilot channel) signal as the third stage and performs despreading of the CPICH signal by using a spreading code belonging to a spreading code group represented by the S-SCH detected.

The CPICH signal has been modulated by using a particular spreading code before transmitted and the mobile station performs despreading of the CPICH signal by a spreading code belonging to the spreading code group. From the correlation result, it is possible to detect the spreading code. The mobile station uses the detected spreading code for demodulation of the data transmitted from the base station to be communicated with.

After completion of detection of the spreading codes, the mobile station generates a spreading code according to the synchronization symbol timing detected and performs despreading at the state synchronized with the received signal, thereby enabling demodulation of a high quality reception data. The receiver used in the mobile station conventionally demodulates received data by using a matched filter as means for detecting synchronization symbol timing and a spreading code generation circuit for generating a spreading code.

Moreover, in the W-CDMA communication method, adjacent base stations can use the same frequency and accordingly, a technique called soft hand over is used. That is, once the adjacent base stations are connected and after complete passing, the original line is cut off. When performing the soft hand over, the mobile station selects and receives a transmission signal from a base station having an intense electric field and frequently switching from one base station to another. For this, the mobile station performs the aforementioned spreading code detection each time the base station is switched.

However, the aforementioned conventional spreading code generation circuit has various problems.

In the receiver of the spectrum spreading communication method, the reception signal should be synchronized with the spreading code in the detection of the spreading code and in demodulation of the reception data. In the conventional spreading code generation circuit, the circuit generating a spreading code (hereinafter, referred to as a spreading code generator) is operated at a high speed so as to advance the spreading code generation timing or operated at low speed or stopped so as to delay the timing, thereby performing phase control so as to obtain synchronization timing of a received signal detected.

The conventional spreading code generation circuit is disclosed in Japanese Patent Publication 7-107006 "Spreading code generation method and apparatus" (Applicant: Sony Co., Ltd.; and inventor: Takehiro Sugita) laid open Apr. 21, 1995. According to this invention, in a receiver of the CDMA communication method, a spreading code generated from the M-series generator is multiplied by a shift vector so as to be shifted by an arbitrary time, which is output to a selector, where a spreading code output with a 1-chip delay is also present. One of them is selectively output from the spreading code generation circuit. In this invention, in order to correspond to the data structure of the spreading code of the CDMA communication method, the operation clock of the M-series generator is operated temporarily at a higher speed than usual or stopped.

Moreover, Japanese Patent Publication 10-173485 discloses "Digital matched filter" (applicant: Mitsubishi Electric Co., Ltd.; Inventor: Kuniyuki Suzuki) laid open on Jun. 26, 1998. According to this invention, a spreading code generated by a spreading code generator circuit is latched in a latch circuit for a predetermined time so as to be delayed and the latch circuit content is updated according to the correlation calculation between the reception data and the spreading code.

However, the conventional spreading code generator circuit has three problems.

The first problem is deterioration of the signal reception characteristic by the phase control on the chip basis. Since the W-CDMA communication is asynchronous communication, synchronization timing of the transmitter and the receiver is shifted due to change of a transmission path environment.

For this, the receiver performs phase control to follow the timing of the transmitter. Conventionally, control has been performed on the chip basis. However, the chip-basis phase control cannot adjust a small timing shift smaller than the chip time, deteriorating the signal reception characteristic.

The second problem is the speed adjustment of the spreading code generation. In the conventional phase control, the spreading code generation circuit has advanced the spreading code generation timing by increasing the frequency of the operation clock of the spreading code generator.

For example, for advancing the generation timing by one frame, i.e., 10 ms, by increasing the clock frequency of the spreading code generator by 4 times, the necessary time is only 2.5 ms. By further increasing the clock frequency, it is possible to advance the phase in a shorter time but the clock frequency that can be set has an upper limit. Moreover, when the clock frequency is increased, power consumption is also increased. Accordingly, for performing a grand phase control, there is a problem that the clock frequency adjustment method is insufficient.

In the spreading code detection processing in the aforementioned W-CDMA communication, a mobile station should detect one spreading code among 512 types. Moreover, the time elapse until detection of the spreading code affects the base station switching time in the soft hand over. Accordingly, reduction of time elapse until synchronization with the reception signal is very important because in the soft hand over an intense signal can be rapidly received, thereby improving the communication quality.

The third problem is a phase control monitoring in multi path. Paths of a transmission signal from the same base station generated in the multi path may increase or decrease in number due to transmission path environment change and the position, i.e., timing may be changed. Moreover, there is a phenomenon that the path position is viewed at a moved position because of the asynchronous communication of the W-CDMA communication method and due to the accuracy of the basic clock of the receiver.

Accordingly, in the receiver, an identified synchronization timing should be slightly shifted for each of the paths to follow it. As a specific method, in the spreading code generation circuit, a phase control amount is monitored for each path so as to perform phase control. Furthermore, in the receiver, a correlation output is performed for each path and RAKE composition is performed as the correlation output result, thereby outputting demodulation result.

Here, the phase control amount is the number of times the phase control (advance/delay) is performed. By monitoring this, it is possible to easily return even when having lost the view of the synchronization timing.

However, conventionally, the phase control amount is performed for each path in the spreading code generation circuit. When the number of paths increases, the entire load on the spreading code generation circuit also increases, affecting the other operation such as spreading code generation and deteriorating demodulation of the reception data.

SUMMARY OF THE INVENTION

It is therefore an object of the present invention to provide a spreading code generation circuit and demodulation circuit capable of maintaining the reception characteristic in the receiver in a preferable condition and performing a grand phase control in a short time, and eliminating the necessity of the phase control amount monitoring.

According to the present invention for solving the above conventional problems, there is provided a spreading code generation circuit which outputs a spreading code used for despreading of spectrum spreading communication and to which there are input, from a control apparatus for detecting a synchronization timing change of a reception base band signal, in accordance with a change, advance/delay information showing advance or delay of phase; control amount information showing the number of continuous implement of phase control for a chip time as an output time basis of the spreading code; symbol offset information showing a symbol count value having a head position of a new slot; slot offset information showing a slot count value having a head position of a new frame; and phase copy information containing an instruction to synchronize with a copy origination frame timing signal, said spreading code generation circuit comprising a sample counter for counting for each sample time and adjusting the count value in accordance with the chip timing signal as the spreading code generation timing and the advance/delay information and the control amount information to perform phase control; a chip timing generator for outputting a chip timing signal when the sample count signal is a first count value; a chip counter for counting in synchronization with the chip timing signal and outputting the count value as a chip count signal; a symbol timing generator for outputting a symbol timing signal when the chip count signal is a second count value; a symbol counter for counting in synchronization with the symbol timing signal and outputting the count value as a symbol count signal; a slot timing generator using the symbol count value indicated by the symbol offset information as a third count value and outputting a slot timing signal when the symbol count signal is the third count value; a slot counter for counting in synchronization with the slot timing signal and outputting the count value as the slot count signal; a frame timing generator using the slot count value indicated by the slot offset information as a fourth count value and outputting a frame timing signal when the slot count signal is the fourth value; a spreading code generator for synchronizing the output timing of a spreading code with the initial phase in accordance with the frame timing signal and outputting the spreading code in synchronization with the chip timing signal; and a phase copy controller for outputting a clear signal for synchronizing the output timings of signals output from the sample counter, the chip counter, the symbol counter and the slot counter with the aforementioned copy origination frame timing signal. Accordingly, it is possible to maintain reception characteristics in a preferable condition and perform a grand phase control in a short time.

Furthermore, according to the present invention, there is provided a demodulation circuit which demodulate a reception base band signal of a spectrum spreading communication, said demodulation circuit comprising a first spreading code generation circuit having the configuration of the above spreading code generation circuit, and outputting a spreading code used for despreading the reception base band signal and a frame timing signal used in synchronization with the reception base band signal; a matched filter block for performing a correlation calculation between the reception base band signal and the spreading code output from the first spreading code generation circuit; a profile block for detecting a path based on the result of the correlation calculation in the matched filter block and outputting the detection result; a plurality of second spreading code generation circuits having the configuration of the spreading code generation circuit, provided for each path, supplied with a frame timing signal, and outputting a spreading code; a plurality of correlator blocks each provided so as to constitute a pair with each of the second spreading code generation circuits, and performing a correlation calculation between the reception base band signal and the spreading code output from the second spreading code generation circuits and demodulation processing; and a controller deciding the synchronization timing of the reception base band signal and the detected path position based on the path detection result output from the profile block, outputting advance/delay information, symbol offset information or slot offset information to the first spreading code generation circuit based on the decision result, synchronizing the output of the spreading code with the synchronization timing of the reception base band signal, outputting phase copy information to all the second spreading code generation circuits, synchronizing the output of the spreading code with the synchronization timing of the reception base band signal, outputting advance/delay information, symbol offset information or slot offset information to the respective second spreading code generation circuits corresponding to the respective paths, and synchronizing the output of the spreading code with the synchronization timing of the respective paths. This eliminates necessity of monitoring the phase control amount.

BRIEF DESCRIPTION OF THE DRAWINGS

FIG. 9 is a time chart diagram of respective signals in the demodulation circuit upon multi path detection.

DESCRIPTION OF THE PREFERRED EMBODIMENT

Description will now be directed to an embodiment of the present invention with reference to the drawings.

The spreading code generation circuit according to the embodiment of the present invention performs phase control on sample time basis, symbol time basis, or slot time basis according to a plurality of types of control signals which have been output according to the synchronization timing change of the reception base band signal. Thus, it is possible to perform a grand phase control in a short time while maintaining preferable reception characteristics in the receiver.

Moreover, the demodulation circuit using the spreading code generation circuit synchronizes an output timing of a spreading code of a spreading code generation circuit provided for each path, with the synchronization timing of the reception base band signal and furthermore, performs phase control of the spreading code generation circuit for each path according to the aforementioned control signals. This eliminates necessity of monitoring the phase control amount, thereby reducing the load.

Figure 1:
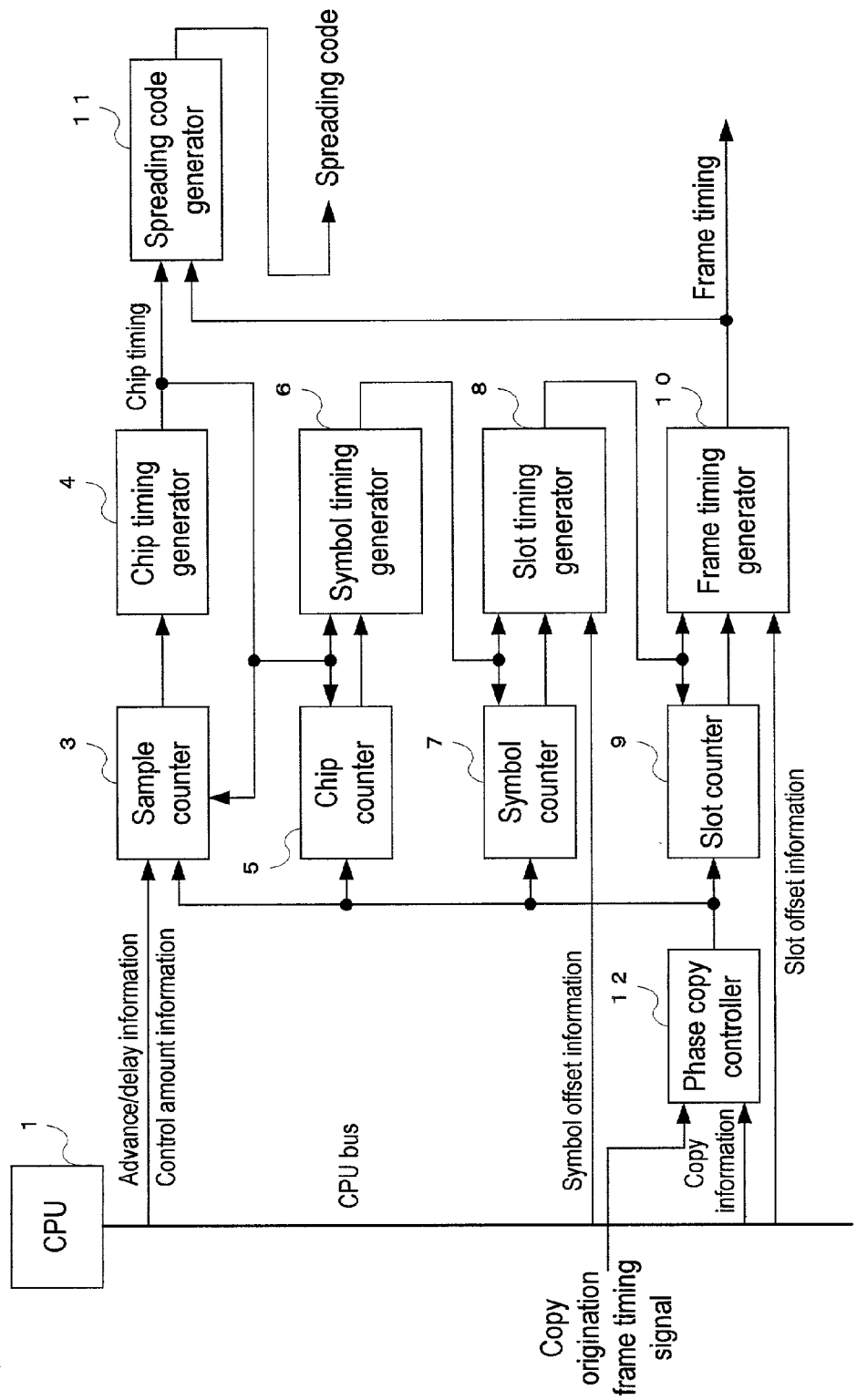
FIG. 1 is a block diagram of a spreading code generation circuit according to an embodiment of the present invention.
Figure 2:
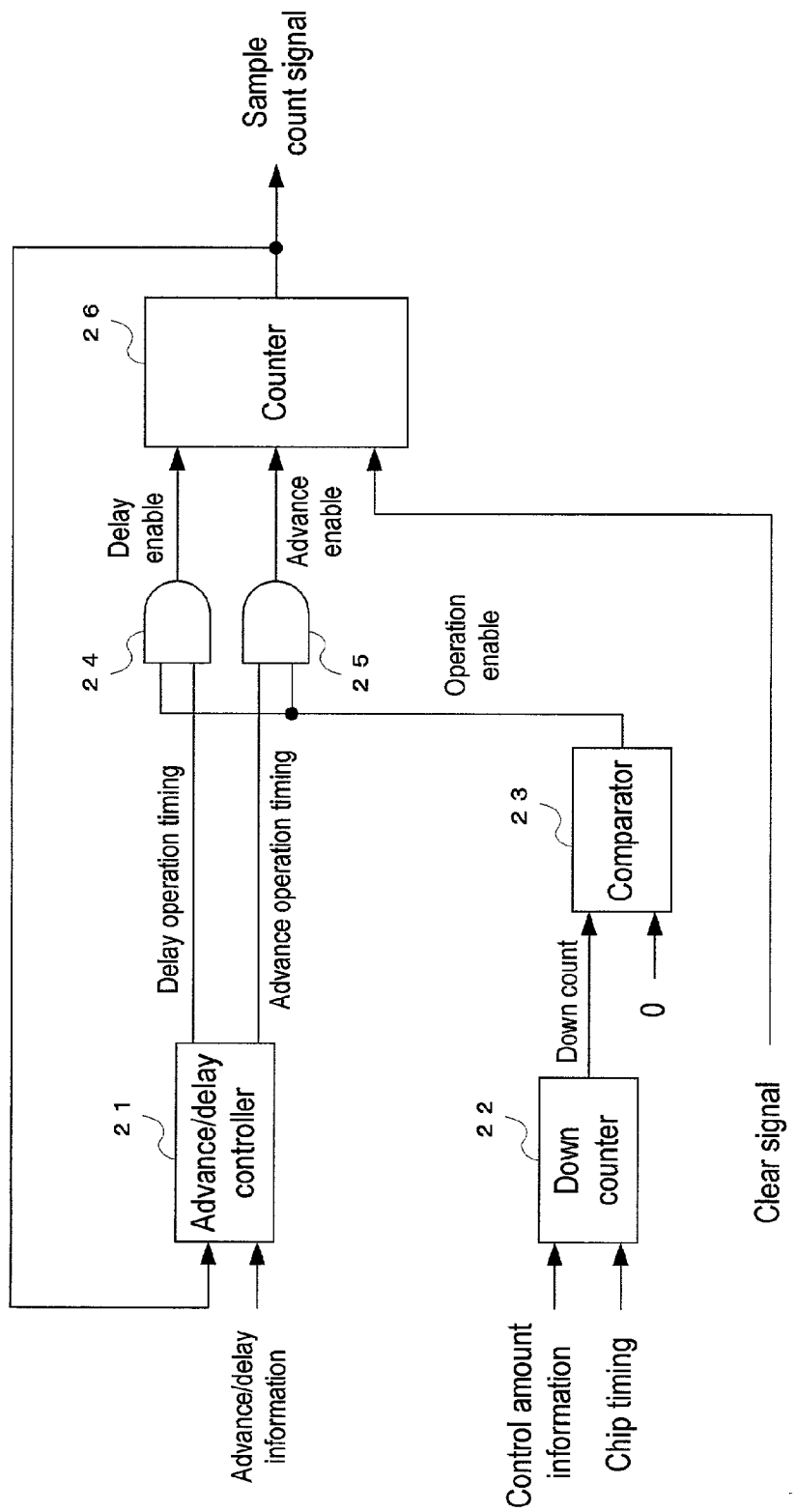
FIG. 2 is a block diagram of a sample counter 3.
Figure 3:
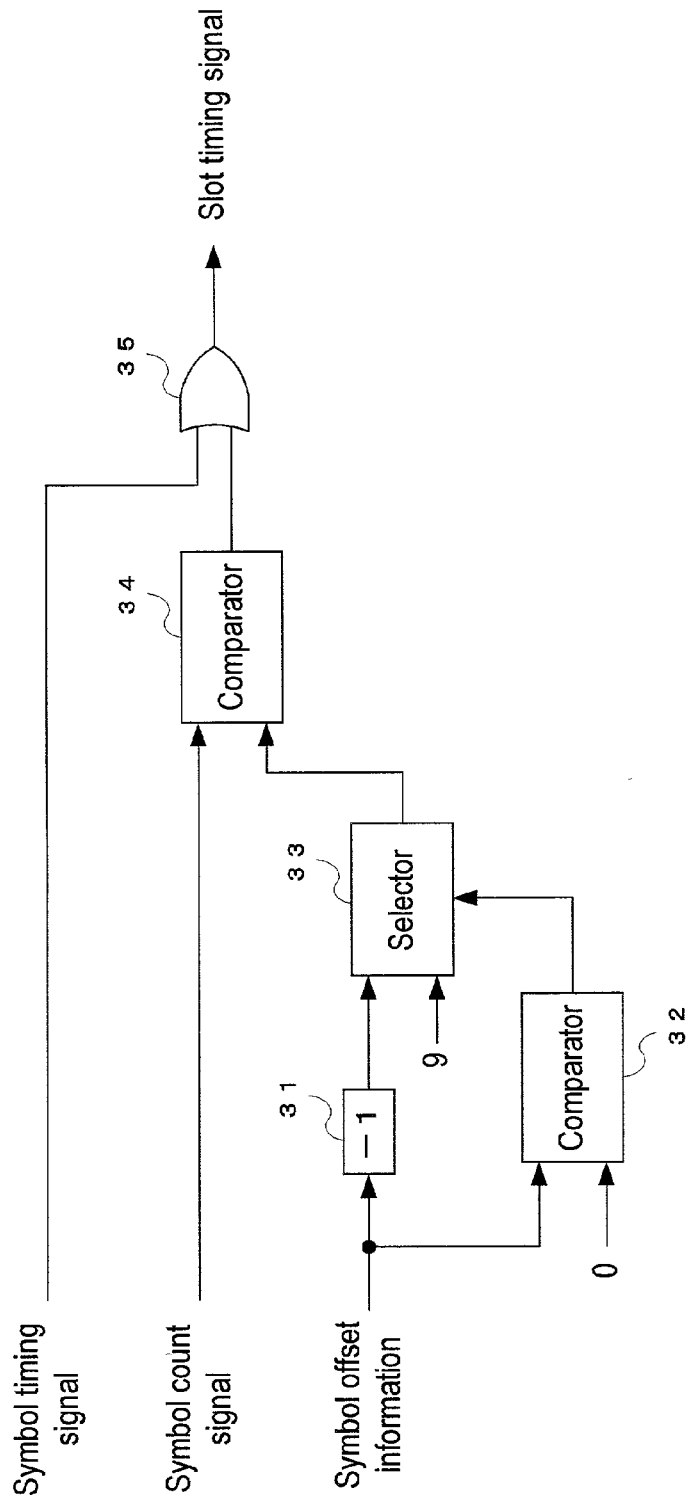
FIG. 3 is a block diagram of a slot timing generator 8.
Figure 4:
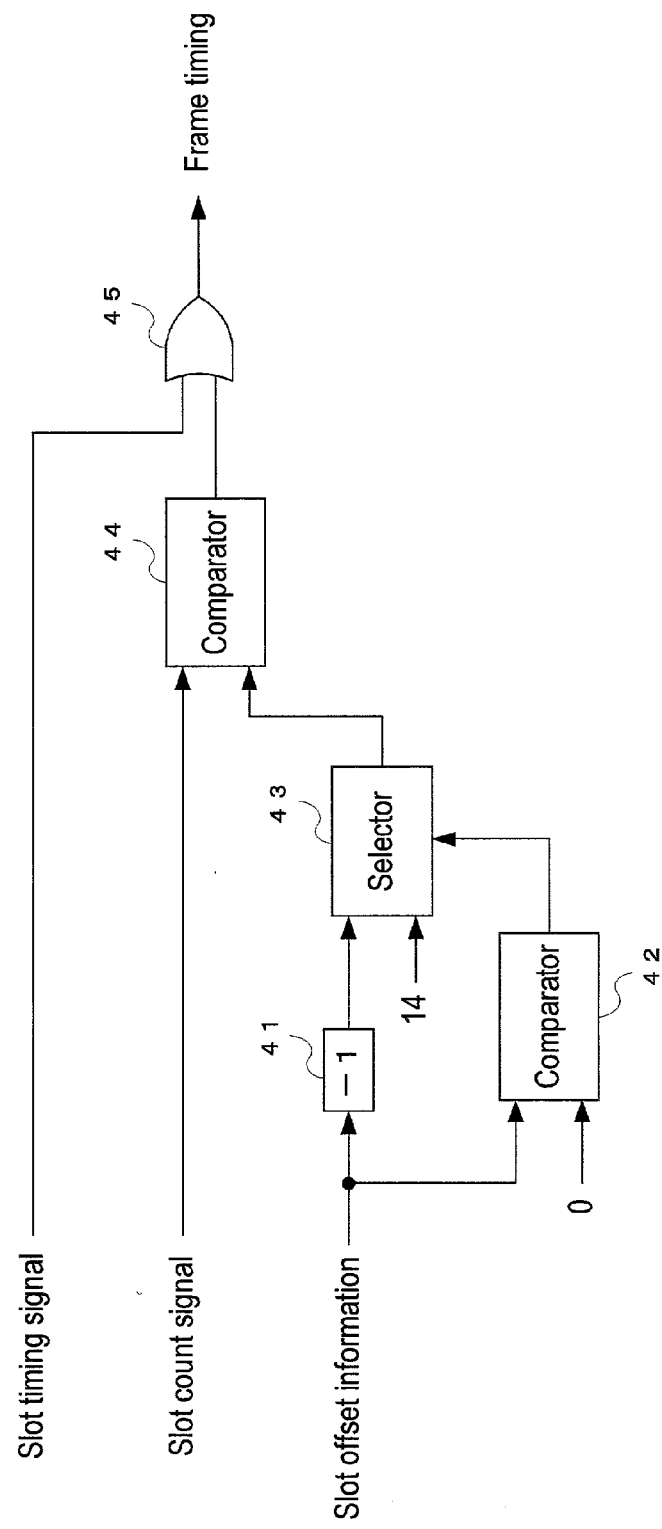
FIG. 4 is a block diagram of a frame timing generator 10.
Figure 8:
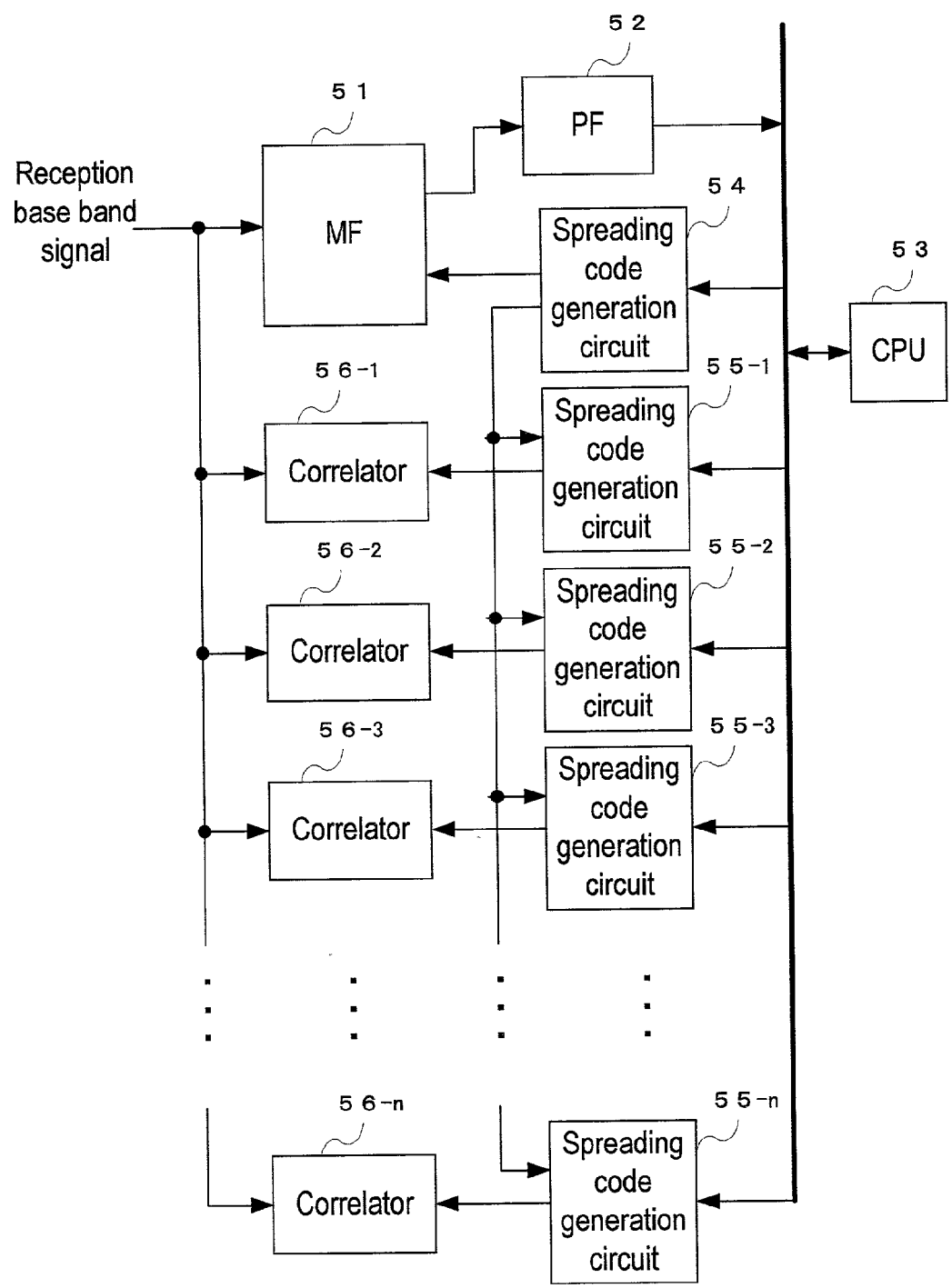
FIG. 8 is a block diagram of a demodulation circuit in the W-CDMA communication mobile station using the spreading code generation circuit according to the embodiment of the present invention.

It should be noted that a control device in claims corresponds to a CPU 1 in FIG. 1; counter means corresponds to a down counter 22 and a comparator 23 in FIG. 2; sample count means corresponds to AND blocks 24, 25 and a counter 25 in FIG. 2; offset control means corresponds to a subtractor 31, a comparator 32, and a selector 33 in FIG. 3, and a subtractor 41, a comparator 42, and a selector 43 in FIG. 4; count comparison means corresponds to a comparator 34 in FIG. 3 and a comparator 44 in FIG. 4; signal generation means corresponds to an OR circuit 35 in FIG. 32 and an OR circuit 45 in FIG. 4; a first spreading code generation circuit corresponds to a spreading code generation circuit 54 in FIG. 8; a second spreading code generation circuit corresponds to a spreading code generation circuit 55 in FIG. 8; and a controller corresponds to a CPU 53 in FIG. 8.

Referring to FIG. 1, explanation will be given on the configuration of the spreading code generation circuit according to the embodiment of the present invention. FIG. 1 is a block diagram of the spreading code generation circuit according to the embodiment of the present invention.

The spreading code generation circuit according to the embodiment of the present invention (hereinafter, referred to as the spreading code generation circuit) includes: a sample counter 3, a chip timing generator 4, a chip counter 5, a symbol timing generator 6, a symbol counter 7, a slot timing generator 8, a slot counter 9, a frame timing generator 10, a spreading code generator 11, and a phase copy controller 12. Moreover, a CPU 1 is provided for controlling output timing of respective signals of the spreading code generation circuit.

Next, explanation will be given on components of the spreading code generation circuit.

The CPU 1 detects a synchronization timing change according to a demodulation result of a reception base band signal in the demodulation circuit (not depicted) and according to this, outputs information related to output timing control of the spreading code via the CPU bus to the respective parts of the spreading code generation circuit.

More specifically, the CPU 1 outputs: an advance/delay information and control amount information to the sample counter 3 of the spreading code generation circuit; symbol offset information to the slot timing generator 8; slot offset information to the frame timing generator 10; and phase copy information to the phase copy controller 12.

The sample counter 3 performs sample-time-basis phase control according to the advance/delay information and control amount information together with the chip timing signal output from the chip timing generator 4, and outputs a new sample count signal by the phase control to the chip timing generator 4.

The sample counter 3 decides the phase control direction according to the advance/delay information and decides the number of times for performing the phase control according to the control amount information, thereby performing phase control on sample time basis.

Moreover, when a clear signal is output from the phase copy controller 12, the sample counter 3 resets its count value to 0.

The chip timing generator 4 outputs a chip timing signal to the sample counter 3, the chip counter 5, the symbol timing generator 6, and to the spreading code generator 11, according to the sample count signal.

The chip counter 5 outputs a chip count signal to the symbol timing generator 6 according to the chip timing signal.

Moreover, when a clear signal is output from the phase copy controller 12, the chip counter 5 resets its count value to 0.

According to the chip timing signal and the chip count signal, the symbol timing generator 6 outputs a symbol timing signal to the symbol counter 7 and the slot timing generator 8.

According to the symbol timing signal, the symbol counter 7 outputs a symbol count signal to the slot timing generator 8.

Moreover, when a clear signal is output from the phase copy controller 12, the symbol counter 7 resets its count value to 0.

The slot timing generator 8 outputs a slot timing signal to the slot counter 9 and the frame timing generator 10 according to the symbol timing signal, the symbol count signal, and the symbol offset signal output from the CPU 1.

The slot timing generator 8 performs offset on symbol time basis according to the symbol offset information.

The slot counter 9 outputs a slot count signal to the frame timing generator 10 according to the slot timing signal.

Moreover, when a clear signal is output from the phase copy controller 12, the slot counter 9 resets its count value to 0.

The frame timing generator 10 outputs a frame timing signal to the spreading code generator 11 and outside the spreading code generation circuit according to the slot timing signal, the slot count signal, and the slot offset information output from the CPU 1.

The frame timing generator 10 performs offset on the slot time basis according to the slot offset information.

The spreading code generator 11 generates a spreading code according to the chip timing signal and the frame timing signal and outputs the code.

The spreading code generator 11 synchronizes a spreading code output timing with an initial phase according to the frame timing signal and generates a spreading code in synchronization with the chip timing signal and outputs the code. The spreading code generator 11 has a shift register provided inside for shifting a spreading code at the chip timing so as to be output.

The phase copy controller 12 outputs a clear signal to the respective counters according to the copy origination frame timing signal and the phase copy information output from the CPU 1. By outputting the clear signal, the phase copy controller 12 clears the counters so as to be synchronized with the frame timing of the copy origination frame.

The copy origination frame timing signal may be output from an apparatus outputting a frame timing signal such as other spreading code generation circuit.

Next, explanation will be given on the operation of the spreading code generation circuit during phase control with reference to FIG. 1 to FIG. 7.

Figure 5:
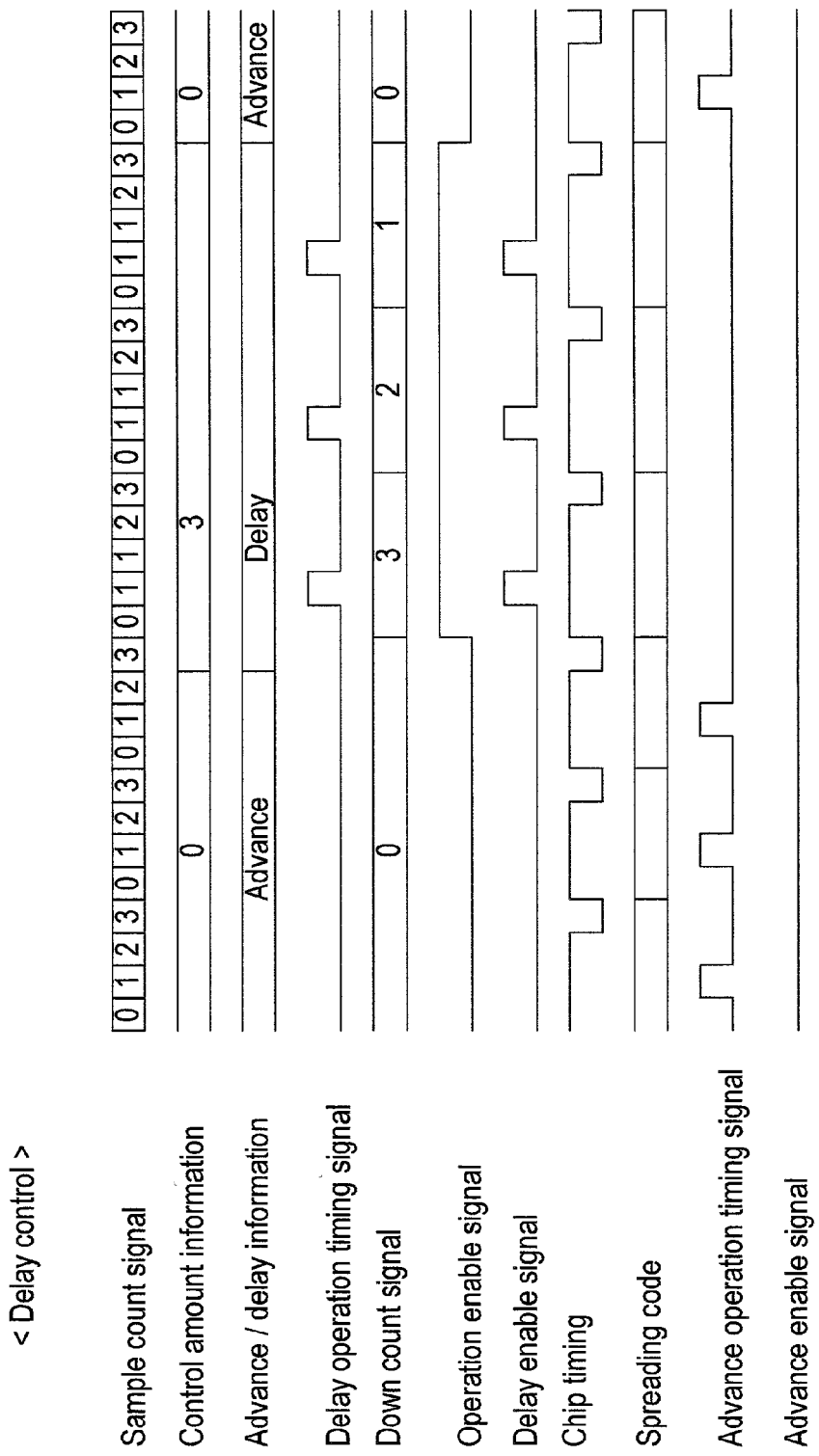
FIG. 5 is a time chart diagram of respective signals in the sample counter 3 when a delay phase control is performed.

Firstly, according to a change of synchronization timing of the reception base band signal, CPU 1 outputs advance/delay information and control amount information to the sample counter 3. As shown in FIG. 5, the advance/delay information represents "advance" or "delay, and the control amount information represents the number of times the chip time phase control is continuously performed.

FIG. 5 is a time chart diagram showing respective signals when phase control of 3-sample delay is performed in the sample counter 3 of the spreading code generation circuit. In FIG. 5, firstly, the advance/delay information is "advance" and the control amount information is 0. At this moment, no phase control is performed in the sample counter 3 and a spreading code is generated at the conventional timing.

Next, the CPU 1 outputs advance/delay information of "advance" and control amount information having three values. The sample counter 3 recognizes these information and starts phase control on sample time basis.

Referring to FIG. 2, explanation will be given on the operation of the phase control in the sample counter 3.

In the sample counter 3, the advance/delay information is fed to an advance/delay controller 21 together with a sample count signal output by the sample counter 3 itself while the control amount information is fed to the down counter 22 together with the chip timing signal.

The advance/delay controller 21 recognizes the content of the advance/delay signal fed and outputs an advance operation timing signal or delay operation timing signal with synchronization with a particular count value of the sample count signal.

Referring back to FIG. 5, explanation will be continued. As shown in FIG. 5, the sample count signal is a signal in which a count value from 0 to 3 cyclically appears such as "0, 1, 2, 3, 0, 1". If the advance/delay information is "advance" when the count value of the sample count signal is "0", the advance/delay controller 21 outputs an advance operation timing for outputting Hi with one sample time delay, i.e., when the count value is "1" and otherwise, Lo.

It should be noted that in the advance/delay controller 21, when the advance/delay information is "advance", Lo is output at the delay operation timing, and when "delay", Lo is output at the advance operation timing.

In FIG. 2, among the signals output from the advance/delay controller 21, the delay operation timing signal is fed to the AND block 24 and the advance operation timing signal is fed to the AND block 25.

Moreover, in the down counter 22, according to the control amount information and the chip timing entered, the down count signal is output to the comparator 23.

In the down counter 22, the control amount information is decremented by the chip timing and the decremented result by one is output as the down count signal. In the flowchart of FIG. 5, when the control amount information is 0, the down counter does not decrement and outputs 0 as the down count signal.

When the control amount information has become 3, the down counter 22 starts decrementing by the chip timing and performs decrement when the chip timing has become Hi and outputs the result as the down count signal. That is, the down count signal represents the number of remaining times of the phase control.

In FIG. 2, the comparator 23 compares the down count signal to 0 and outputs the comparison result as an operation enable signal to the AND blocks 24 and 25.

As shown in FIG. 5, comparator outputs 0 if the comparison result in matched, and 1 if not matched.

The AND block 24 performs AND calculation of the delay operation timing signal and the operation enable signal entered and outputs the calculation result as a delay enable signal to the counter 26. Similarly, the AND block 25 performs AND calculation of the advance operation timing signal and the operation enable signal entered and outputs the calculation result as an advance enable signal to the counter 26.

In FIG. 5, when the advance/delay information is "delay" and the operation enable signal is 1, the delay enable signal outputs 1 in synchronization with the delay operation timing signal. That is, the AND blocks output a signal showing a phase control sampling timing showing a phase control direction.

The counter 26 always performs sample count from 0 to 3 and outputs a sample count signal including the count result. Moreover, the counter 26 performs phase control on sample time basis according to the delay enable signal or advance enable signal entered, and reflects the control result in the sample count signal.

As shown in FIG. 5, when the delay enable signal is entered, i.e., the count value is "1", the counter 26 stops counting operation and repeatedly outputs "1". In FIG. 5, the delay enable signal is output for 3 chips continuously and accordingly, the counter 26 counts 1 twice such as "0, 1, 1, 2, 3, 0" and repeats this for three cycles.

The sample count signal is output to the chip timing generator 4 and a chip timing signal based on the phase control result is output and is directly reflected in the spreading code output timing. By the aforementioned series of operations, phase control is performed to delay by 3-sample time.

Moreover, a clear signal output from the phase copy controller 12 is also fed to the counter 26. When the clear signal is input, the counter 26 forcibly resets its count value to "0" and synchronizes it with the frame timing of the copy origination frame.

Figure 6:
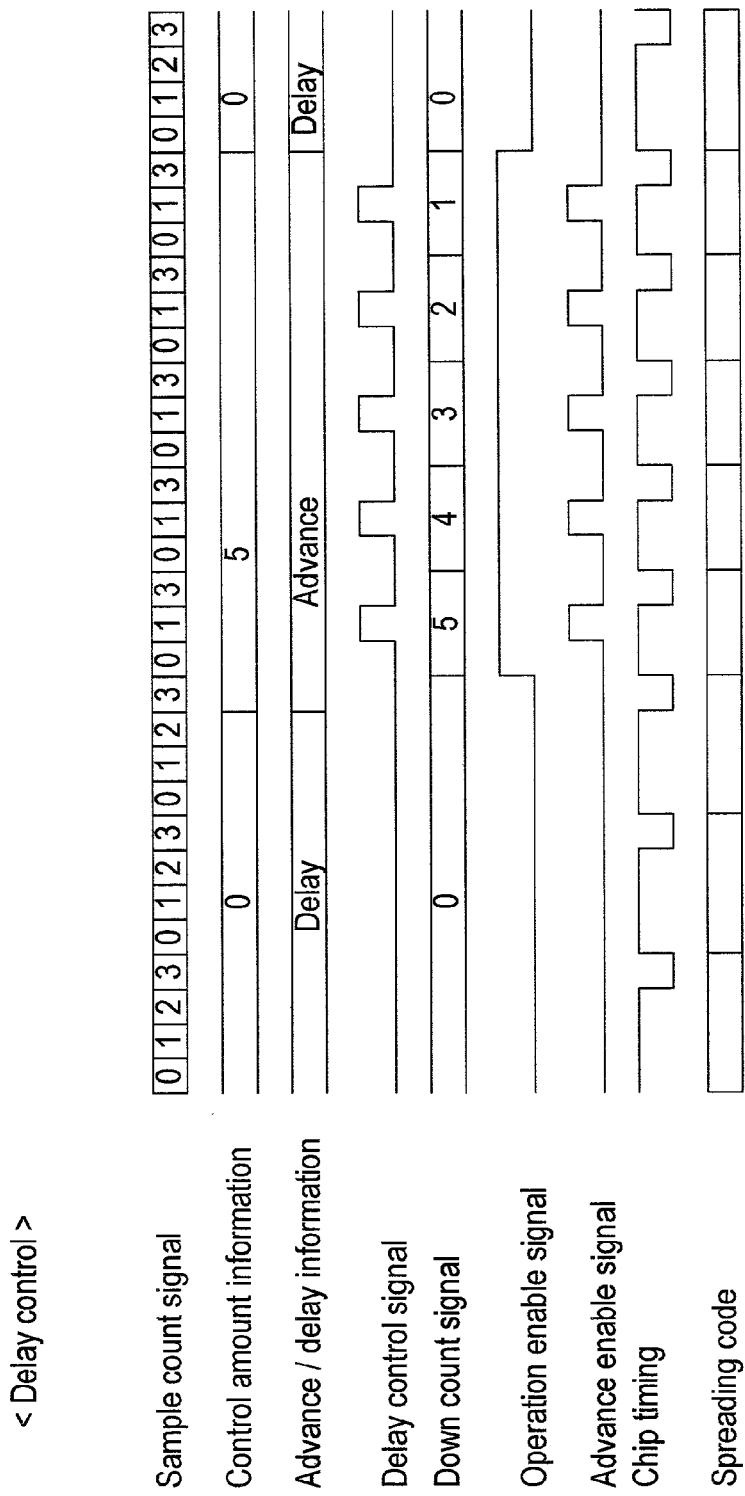
FIG. 6 is a time chart diagram of respective signals in the sample counter 3 when an advance phase control is performed.

Moreover, FIG. 6 is a time chart of the respective signals when advance phase control by 5-sample time is performed. The sample counter 3 can also perform advance phase control according to the aforementioned operation and accordingly, explanation on the advance phase control operation in the sample counter 3 is omitted.

In FIG. 6, advance/delay information of "advance" and control amount information of "5" are simultaneously entered and accordingly, the advance enable signal continues by 5 chips and the sample count is output at timing "1".

The counter 26 counts up by 2 at sampling when the advance enable signal is input, i.e., when the count value is "1", and outputs "3" after "1". Accordingly, the counter 26 outputs a sample count signal performing count operation of "0, 1, 3, 0" repeatedly five cycles. The phase control result is reflected in the chip timing signal and the spreading code.

In FIG. 1, the sample counter 3 outputs a sample count signal corresponding to the phase control on sample time basis to the chip timing generator 4. The chip timing generator 4 generates a chip timing signal according to the sample count signal and outputs it to the spreading code generator 11 simultaneously with output from the chip counter 5 and the symbol timing generator 6. As shown in FIG. 5 or FIG. 6, the chip timing generator 4 outputs a chip timing signal which is Lo when the count value is "3" and Hi otherwise.

The chip counter 5 counts the number of chips according to the chip timing signal supplied and outputs the result as a chip count signal to the symbol timing generator 6.

The chip counter 5 cyclically counts from 0 to 255 according to the chip timing signal. A clear signal output from the phase copy controller 12 is also supplied to the chip counter 5. When the clear signal is supplied, the chip counter 5 forcibly resets its count value to "0" and is synchronized with the frame timing of the copy origination frame.

The symbol timing generator 6 outputs the symbol timing signal to the symbol counter 7 and the slot timing generator 8 according to the chip timing signal and the chip count signal.

The symbol timing generator 6 outputs a symbol timing signal which is Lo when the chip count signal count value is "255" and the chip timing signal is Lo, and otherwise Hi.

The symbol counter 7 counts the number of symbols according to the symbol timing signal supplied and outputs the result as a symbol count signal to the slot timing generator 8.

The symbol counter 7 cyclically counts from 0 to 9 according to the symbol timing signal. A clear signal output from the phase copy controller 12 is also supplied to the symbol counter 7. When the clear signal is supplied, the symbol counter forcibly resets its count value to "0" and is synchronized with the frame timing of the copy origination frame.

The slot timing generator 8 output the symbol timing signal to the slot counter 9 and the frame timing generator 10 according to the symbol timing signal and the symbol count signal.

Moreover, the slot timing generator 8 performs offset on symbol time basis according to the symbol offset information output from the CPU 1.

Figure 7:
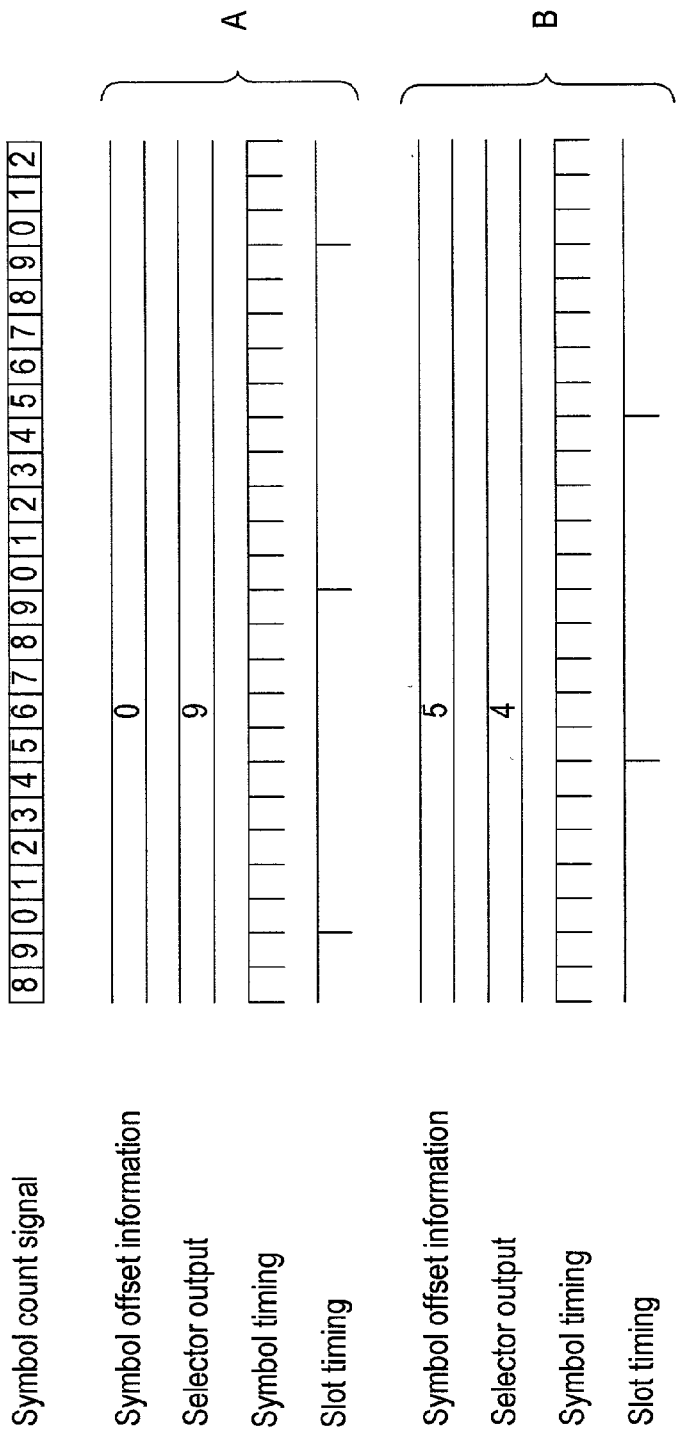
FIG. 7 is a time chart diagram of respective signals in the slot timing generator 9.

Referring to FIG. 3 and FIG. 7, explanation will be given on the output operation of the slot timing signal in the slot timing generator 8. FIG. 3 is a block diagram showing configuration of the slot timing generator 8. FIG. 7 is a time chart of respective signals in the slot timing generator 9 of the spreading code generation circuit. FIG. 7A shows a case when the symbol offset information is "0" and FIG. 7B shows a case when the symbol offset information is "5". As shown in FIG. 7, the symbol offset information has count value information of a symbol count to be adjusted at the head position of the slot.

In the slot timing generator 8, the symbol timing signal is supplied to the OR circuit 35; the symbol count signal is supplied to the comparator 34; and the symbol offset information is supplied to the subtractor 31 and the comparator 32.

In FIG. 3, in the subtractor 31, the symbol offset information is subtracted by 1 and the subtraction result is output to the selector 33. When the symbol offset information is 0, no subtraction is performed and the symbol offset information is output as it is to the selector 33.

Moreover, the comparator 32 compares the symbol offset information to 0 and outputs 0 to the selector 33 if matched and 1 if not matched.

The selector 33 is supplied with the subtraction result of the subtractor 31, the comparison result of the comparator 34, and the numeric "9". The selector 33 compares the subtraction result of the subtractor 31 with the comparison result of the comparator 32 and outputs "9" as the offset count value to the comparator 34 if they are matched, and outputs the subtraction result if they are not matched.

As shown in FIG. 7, the symbol count signal changes its count value when a new symbol timing signal is supplied. Accordingly, generation of a slot timing signal should be performed at a value preceding the actual count. For example, when the symbol offset information is 0, the symbol timing signal is cyclically 0 to 9. Accordingly, the selector 33 outputs "9" so as not to lose sight of the head position. By the aforementioned selection processing in the selector 33, it is possible to assure the slot head position according to the symbol offset information.

The comparator 34 compares the symbol count signal with the offset count value, and outputs 0 if matched and 1 if not matched, to the OR circuit 35.

Moreover, the OR circuit 35 performs OR calculation of the symbol timing signal and the comparison result output from the comparator and outputs the calculation results as a slot timing signal.

As shown in FIG. 7A, when the symbol offset information is 0, the selector 33 outputs "9". Furthermore, according to the comparison in the comparator 34 and the OR calculation in the OR circuit 35, when the symbol count signal has a count value "9" and the symbol timing signal is Lo, the slot timing signal outputs Lo and otherwise Hi. In FIG. 7, the synchronization timing between the symbol timing signal and the slot timing signal is represented by Lo and in the OR circuit, calculation is performed assuming Lo as 0.

Similarly, as shown in FIG. 7B, when the symbol offset information is "5", the selector 33 outputs "4", and the slot timing signal has a symbol count signal count value "4" and outputs Lo when the symbol timing signal is Lo and otherwise, Hi.

By the aforementioned series of operations, the slot timing generator 8 can perform offset on symbol time basis according to the symbol offset information and can perform phase control on symbol time basis.

The slot counter 9 counts the number of slots according to the slot timing signal supplied and outputs the result as a slot count signal to the frame timing generator 10.

The slot counter 9 cyclically counts 0 to 14 in accordance with the slot timing signal. Moreover, a clear signal output from the phase copy controller 12 is also supplied to the slot counter 9. When the clear signal is supplied, the slot counter forcibly resets its count value to "0" and is synchronized with the frame timing of the copy origination frame.

The frame timing generator 10 outputs the frame timing signal to the spreading code generator 11 and outside the spreading code generation circuit according to the slot timing signal and the slot count signal.

Moreover, the frame timing generator 10 performs offset on slot time basis according to the slot offset information output from the CPU 1.

FIG. 4 is a block diagram showing configuration of the frame timing generator 10. A numeric "14" is supplied to the selector 43 and according to the comparison result, the numeric "14" or the subtraction result of the subtractor 41 is output. This is different from the slot timing generator in FIG. 3. The other configuration and operations are identical to those of FIG. 3 and their explanations are omitted. Moreover, like the symbol offset information, the slot offset information also has count value information of the slot count to be adjusted at the frame head position.

By the frame timing generator 10, offset can be performed on slot time basis according tot he slot offset information and can perform phase control on slot time basis.

In the spreading code generator 11, according to the chip timing output from the chip timing generator 4 and the frame timing signal output from the frame timing generator 10, a spreading code is generated and output.

The spreading code generator 11 can set spreading code generation timing on frame time basis according to the frame timing signal and according to the chip timing signal, shifts the generated spreading code by the shift register provided inside, thereby outputting the spreading code.

Moreover, the phase copy controller 12 is supplied with a copy origination frame timing signal and a phase copy information output from the CPU 1. The copy origination frame timing signal is a frame timing signal for synchronization in the spreading code generation circuit, and the phase copy information is information containing an instruction of synchronization. According to these signals, the phase copy controller 12 outputs a clear signal to the sample counter 3, the chip counter 5, the symbol counter 7, and the slot counter 8.

When the clear signal is supplied, the counters clear their count values, i.e., reset the values to 0. The clear signal is output in synchronization with the copy origination frame timing signal and the counters output count signals in synchronization with the frame timing of the copy origination frame.

In the spreading code generation circuit, by adjusting the count value of the sample count signal of the sample counter 3 according to the advance/delay information and the control amount information, the spreading code generation timing of the spreading code generator 11 can be phase-controlled on sample time basis. With this configuration, it is possible to prevent deterioration of the demodulation of the reception data and maintain the reception characteristic of the reception data in a preferable condition.

Moreover, in the spreading code generation circuit, it is possible to adjust the head position of the slot timing signal in the slot timing generator 8 according to the symbol offset information and adjust the head position of the frame timing signal in the frame timing generator 10 according to the slot offset information. With this configuration, it is possible to perform phase control of the spreading code generation timing of the spreading code generator 11 on symbol time basis and slot time basis, thereby performing a grand phase control. Especially in the spreading code generation circuit, it is possible to perform a grand phase control in a short time without adjusting clock frequency of the spreading code generator 11.

In the spreading code generation circuit, the sample counter 3, the slot timing generator 8, and the frame timing generator 10 may be other circuits if identical output result can be obtained.

Next, referring to FIG. 8, explanation will be given on configuration of a demodulation circuit using the spreading code generation circuit. FIG. 8 is a block diagram of a demodulation circuit in a mobile station in the W-CDMA communication using the spreading code generation circuit. The demodulation circuit of FIG. 8 demodulates a reception base band signal input for each path while performing phase control of output of a spreading code for a multi path.

The demodulation circuit of FIG. 8 is composed of a matched filter block (MF in the figure) 51, a profile block (PF in the figure), a CPU 53, a spreading code generation circuit 54, a plurality of spreading code generation circuits 55, and a plurality of correlators 56.

The matched filter block 51 performs correlation calculation to the reception base band signal received in a mobile station, according to a spreading code output from the spreading code generation circuit 54 and outputs the correlation result to the profile block 52.

The profile block 52 calculates an average of the correlation results output from the matched filter block 51 and outputs the detection results to the CPU 53.

According to the path detection result output from the profile block 52, the CPU 53 decides the synchronization timing and performs window movement control of the matched filter block 51 and synchronization control with the path position for each of the correlator blocks 56. The CPU 53 has the function of the CPU 1 of FIG. 1.

The spreading code generation circuit 54 performs phase control of generation timing of a spreading code according to the signal output from the CPU 53 and outputs a spreading code to the matched filter block 51.

The spreading code generation circuit 55 is provided for each of the correlator blocks 56 and performs phase control of generation timing of a spreading code according to the signal output from the CPU 53 and outputs a spreading code to a corresponding correlator block 56.

Moreover, the spreading code generation circuit 54 generates a frame timing signal and outputs it as a copy origination frame timing signal to a plurality of spreading code generation circuit 55.

The correlator block 56 performs correlation calculation between the reception base band signal entered and the spreading code output from the corresponding spreading code generation circuit 55 and outputs the correlation calculation result. The correlator block 56 is provided for each of the paths for performing correlation calculation for each of the paths.

The correlation calculation result in the correlator block 56 is demodulated by coding an error correction.

Next, explanation will be given on the operation of the demodulation circuit of FIG. 8.

In a mobile station having a demodulation circuit of FIG. 8, when power is turned on, the mobile station performs a spreading code in three stages as has been described above in order to identify a base station to communicate with and synchronize with it.

In the first stage, the mobile station detects a P-SCH which is transmitted for one symbol for one slot and detects synchronization timing of the reception base band signal. In the demodulation circuit of FIG. 8, in the matched filter block 51, a correlation calculation of the reception base band signal is performed by using the same spreading code as the spreading code used in modulation in the transmitter, and furthermore in the profile block 52, synchronization symbol timing is detected according to the correlation calculation result.

In the second and third stages, the mobile station detects a spreading code group and a spreading code. In the demodulation circuit of FIG. 8, on the synchronization symbol timing detected in the first stage, a window of the matched filter block 51 is matched. More specifically, the CPU 53 outputs to the spreading code generation circuit 54, symbol offset information, advance/delay information, and control amount information and performs phase control on the sample time basis or symbol time basis.

Moreover, in the second and third stages, when a spreading code is detected, a long code identification is also performed, and in the mobile station it is possible to detect the frame timing of the reception base band signal. After detection of the frame timing, in the demodulation circuit of FIG. 8, on the frame timing detected, a window of the matched filter block 51 is matched. More specifically, the CPU 53 outputs slot offset information to the spreading code generation circuit 54 and performs phase control on slot time basis.

After identification of the base station, the mobile station demodulates the reception base band signal. In the demodulation circuit of FIG. 8, multi path detection is performed in the matched filter block 51 and the profile block 52 and the path detection result is output to the CPU 53. The CPU 53 decides the position of each path according to the detection result.

According to the path position, the CPU 53 synchronizes the demodulation timing of the correlator block 56 corresponding to each path with the path position. More specifically, the CPU 53 firstly outputs a phase copy information synchronized with the spreading code generation timing in the spreading code generation circuit 54, to the spreading code generation circuit 55 corresponding to the correlator block 56.

Furthermore, the spreading code generation circuit 54 generates a frame timing signal and outputs it as a copy origination frame timing signal to the spreading code generation circuits 55. In the respective spreading code generation circuits 55, according to the phase copy information and the copy origination frame signal, synchronization with the spreading code generation timing in the matched filter block 51 is performed.

Next, the CPU 53 outputs advance/delay information and control amount information for each oft the spreading code generation circuits 55 according to the path position. Hereinafter, in each of the spreading code generation circuits 55, phase control is performed on sample time basis and the spreading code generation timing is synchronized with the path position. Accordingly, each of the correlator blocks 56 can perform an accurate demodulation processing according to the corresponding path position.

Here, explanation will be given on signal timing transition during multi path detection with reference to FIG. 9. FIG. 9 is a time chart of respective signals in the demodulation circuit during the multi path detection. In the time chart of FIG. 9, FIG. 9A to FIG. 9E show signals when the mobile station power switch is turned on; FIG. 9F to FIG. 9G shows signals after the phase copy information is output; and FIG. 9H to FIG. 9I show signals after the advance/delay information is output.

FIG. 9A is a frame timing signal used in correlation calculation in the matched filter block 51 and is equivalent to the copy origination frame timing signal output from the spreading code generation circuit 54. In FIG. 9A, the window of the matched filter block 51 is a range that can be the head of the frame timing signal. When the path position is within the window, the path can be detected by the matched filter block 51.

FIG. 9B shows a path position detected in the matched filter block 51. The path position is within the window in FIG. 9A.

FIG. 9C shows a position of the spreading code of the reception data and shows the spreading code generation timing at modulation. Moreover, FIG. 9C is synchronized with FIG. 9B. In FIG. 9C, 0-th chip of the spreading code, i.e., the head position corresponds to the path position.

FIG. 9D is a frame timing signal used in the correlator block 56 corresponding to the path of FIG. 9B. Moreover, FIG. 9E is a position of the spreading code in the correlator block 56 and the spreading code generation circuit 55 corresponding to this correlator block 56 generates a spreading code starting at this position.

When power switch is turned on in the mobile station, no synchronization is present between the base station and the mobile station and accordingly, as shown in FIG. 9D, the position of the spreading code in the correlator block 56 is different from the path position detected in FIG. 9B. For this, in the demodulation circuit, the spreading code generation timing of the correlator block 56 is adjusted so as to synchronize with the path position.

As has been described above, in the demodulation circuit of FIG. 8, in demodulating the reception base band signal, to the correlator block 56, firstly, synchronization with the spreading code generation timing in the matched filter block 51 is performed and then phase control on sample time basis is performed for each path.

The former is performed according to the phase copy information and the copy origination frame timing signal. The frame timing signal used in the correlator block 56 and the position of the spreading code in the correlator block 56 are as shown in FIG. 9F ad FIG. 9G and is synchronized with 9A as a result.

The latter is performed according to the advance/delay information and the control amount information and their timings are as shown in FIG. 9H and FIG. 9I and synchronized with FIG. 9C as a result. Accordingly, in the correlator block 56, the reception data can be decoded hereinafter.

According to the demodulation circuit of FIG. 8, by outputting the phase copy information to each of the spreading code generation circuits 55, the CPU 53 can synchronize the spreading code generation circuits 55 with the spreading code generation timing in the matched filter block 51, i.e., the copy origination frame timing. With this configuration, it is possible to adjust the spreading code generation timing all at once when the spreading code generation circuit 55 generates a spreading code at any timing.

Especially when having lost sight of the synchronization position, the mobile station need not be reset and it is possible to rapidly detect the spreading code generation timing for each path.

Moreover, the position of each path is decided in the CPU 53 and the advance/delay information and the control amount information are output for each path for performing phase control of the spreading code generation timing. Accordingly, in the present spreading code generation circuit, there is no need of monitoring the timing and phase control amount for each path, thereby reducing the load on the entire spreading code generation circuit.

According to the present invention, the spreading code generation circuit outputs a spreading code used for despreading of the spectrum spreading communication and is supplied from the control apparatus detecting the synchronization timing change of the reception base band signal with, according to a change: advance/delay information showing advance or delay of phase; control amount information showing the number of times phase control is continuously performed for the chip time as an output time basis of the spreading code; symbol offset information showing a symbol count value having a head position of a new slot; slot offset information showing a slot count value having a head position of a new frame; and phase copy information containing an instruction to synchronize with the copy origination frame timing signal. The spreading code generation circuit includes: a sample counter for counting for each sample time and adjusting the count value to perform phase control according to the chip timing signal as the spreading code generation timing and the advance/delay information and the control amount information; a chip timing generator for outputting a chip timing signal when the sample count signal is the first count value; a chip counter for counting in synchronization with the chip timing signal and outputting the chip count value as a chip count signal; a symbol timing generator for outputting the symbol timing signal when the chip count value is the second count value; a symbol counter for counting in synchronization with the symbol timing signal and outputting the count value as a symbol count signal; a slot timing generator using the symbol count value indicated by the symbol offset information as a third count value and outputting the slot timing signal when the symbol count signal is the third count value; a slot counter for counting in synchronization with the slot timing signal and outputting the count value as the slot count signal; a frame timing generator using the slot count value indicated by the slot offset information as a fourth count value and outputting a frame timing signal when the slot count signal is the fourth value; a spreading code generator for synchronizing the output timing of a spreading code with the initial phase according to the frame timing signal and outputting the spreading code in synchronization with the chip timing signal; and a phase copy controller for outputting a clear signal for synchronizing the output timings of signals output from the sample counter, the chip counter, the symbol counter, and the slot counter, with the aforementioned copy origination frame timing signal. Accordingly, it is possible to maintain reception characteristics in a preferable condition and perform a grand phase control in a short time.

Moreover, the demodulation circuit according to the present invention demodulates a reception base band signal of the spectrum spreading communication an has configuration of the aforementioned spreading code generation circuit. The demodulation circuit includes: a spreading code used for despreading the reception base band signal; a first spreading code generation circuit for outputting a frame timing signal used in synchronization with the reception base band signal; a matched filter block for performing a correlation calculation between the reception base band signal and the spreading code output from the first spreading code generation circuit; a profile block for detecting a path according to the result of the correlation calculation in the matched filter block and outputting the detection result; a plurality of second spreading code generation circuits having the aforementioned spreading code generation circuit, provided for each path, supplied with a frame timing signal, and outputting a spreading code; a plurality of correlator blocks each provided so as to constitute a pair with each of the second spreading code generation circuits and performing a correlation calculation between the reception base band signal and the spreading code output from the second spreading code generation circuits and demodulation processing; and a controller. The controller decides the synchronization timing of the reception base band signal and the detected path position according to the path detection result output from the profile block. According to the decision result, the controller outputs advance/delay information, symbol offset information, or slot offset information to the first spreading code generation circuit. The controller synchronizes output of the spreading code with the synchronization timing of the reception base band signal and outputs phase copy information to all the second spreading code generation circuits. The controller synchronizes output of the spreading code with the synchronization timing of the reception base band signal. Furthermore, the controller outputs advance/delay information, symbol offset information or slot offset information to the respective second spreading code generation circuits corresponding to the respective paths and synchronizes output of the spreading code with the synchronization timing of the respective paths. This eliminates necessity of monitoring the phase control amount.

What is claimed is:

1. A spreading code generation circuit which outputs a spreading code used for despreading of spectrum spreading communication and to which there are input, from a control apparatus for detecting a synchronization timing change of a reception base band signal, in accordance with a change, advance/delay information showing advance or delay of phase; control amount information showing the number of continuous implement of phase control for a chip time as an output time basis of the spreading code; symbol offset information showing a symbol count value having a head position of a new slot; slot offset information showing a slot count value having a head position of a new frame; and phase copy information containing an instruction to synchronize with a copy origination frame timing signal, said spreading code generation circuit comprising a sample counter for counting for each sample time and adjusting the count value in accordance with the chip timing signal as the spreading code generation timing and the advance/delay information and the control amount information to perform phase control;

a chip timing generator for outputting a chip timing signal when the sample count signal is a first count value;

a chip counter for counting in synchronization with the chip timing signal and outputting the count value as a chip count signal;

a symbol timing generator for outputting a symbol timing signal when the chip count signal is a second count value;

a symbol counter for counting in synchronization with the symbol timing signal and outputting the count value as a symbol count signal;

a slot timing generator using the symbol count value indicated by the symbol offset information as a third count value and outputting a slot timing signal when the symbol count signal is the third count value;

a slot counter for counting in synchronization with the slot timing signal and outputting the count value as the slot count signal;

a frame timing generator using the slot count value indicated by the slot offset information as a fourth count value and outputting a frame timing signal when the slot count signal is the fourth value;

a spreading code generator for synchronizing the output timing of a spreading code with the initial phase in accordance with the frame timing signal and outputting the spreading code in synchronization with the chip timing signal; and a phase copy controller for outputting a clear signal for synchronizing the output timings of signals output from the sample counter, the chip counter, the symbol counter and the slot counter with the aforementioned copy origination frame timing signal.

2. The spreading code generation circuit according to claim 1, wherein the sample counter includes:

an advance/delay controller for outputting an advance/delay signal showing an advance or delay direction when the advance/delay information and the sample count signal have a particular count value;

counting means for decrementing the number of timers phase control is continuously performed in synchronization with the chip timing and outputting an operation enable signal other than the decrement result is zero; and sample count means for counting for each sample time and stops counting in synchronization with the operation enable signal if the advance/delay information is delay and advances counting in synchronization with the operation enable signal if the advance/delay information is advance; outputting these count values in these counting as sample count signals and synchronize with the copy origination frame timing signal according to the clear signal.

3. The spreading code generation circuit according to claim 1, wherein the slot timing generator includes:

offset control means for subtracting the symbol offset information with a particular value and outputting the offset count value;

comparison means for comparing the count value indicated by the symbol count signal of the offset count value and outputting the comparison result; and signal generation means for generating a slot timing signal when the comparison result is equal.

4. The spreading code generation circuit according to claim 2, wherein the slot timing generator includes:

offset control means for subtracting the symbol offset information with a particular value and outputting the offset count value;

comparison means for comparing the count value indicated by the symbol count signal of the offset count value and outputting the comparison result; and signal generation means for generating a slot timing signal when the comparison result is equal.

5. The spreading code generation circuit according to claim 1, wherein the frame timing generator includes:

offset control means for subtracting the offset information with a particular value and outputting the offset count value;

count comparison means for comparing the count value indicated by the slot count signal and the offset count value and outputting the comparison result; and signal generation means for outputting a frame timing signal when the comparison result is equal.

6. The spreading code generation circuit according to claim 2, wherein the frame timing generator includes:

offset control means for subtracting the offset information with a particular value and outputting the offset count value;

count comparison means for comparing the count value indicated by the slot count signal and the offset count value and outputting the comparison result; and signal generation means for outputting a frame timing signal when the comparison result is equal.

7. The spreading code generation circuit according to claim 3, wherein the frame timing generator includes:

offset control means for subtracting the offset information with a particular value and outputting the offset count value;

count comparison means for comparing the count value indicated by the slot count signal and the offset count value and outputting the comparison result; and signal generation means for outputting a frame timing signal when the comparison result is equal.

8. A demodulation circuit which demodulate a reception base band signal of a spectrum spreading communication, said demodulation circuit comprising a first spreading code generation circuit having the configuration of the spreading code generation circuit according to claim 1, and outputting a spreading code used for despreading the reception base band signal and a frame timing signal used in synchronization with the reception base band signal;

a matched filter block for performing a correlation calculation between the reception base band signal and the spreading code output from the first spreading code generation circuit;

a profile block for detecting a path based on the result of the correlation calculation in the matched filter block, and outputting the detection result;

a plurality of second spreading code generation circuits having the configuration of the spreading code generation circuit according to claim 1, provided for each path, supplied with a frame timing signal, and outputting a spreading code;

a plurality of correlator blocks each provided so as to constitute a pair with each of the second spreading code generation circuits, and performing a correlation calculation between the reception base band signal and the spreading code output from the second spreading code generation circuits and demodulation processing; and a controller deciding the synchronization timing of the reception base band signal and the detected path position based on the path detection result output from the profile block, outputting advance/delay information, symbol offset information or slot offset information to the first spreading code generation circuit based on the decision result, synchronizing the output of the spreading code with the synchronization timing of the reception base band signal, outputting phase copy information to all the second spreading code generation circuits, synchronizing the output of the spreading code with the synchronization timing of the reception base band signal, outputting advance/delay information, symbol offset information or slot offset information to the respective second spreading code generation circuits corresponding to the respective paths, and synchronizing the output of the spreading code with the synchronization timing of the respective paths.

9. A demodulation circuit which demodulate a reception base band signal of a spectrum spreading communication, said demodulation circuit comprising a first spreading code generation circuit having the configuration of the spreading code generation circuit according to claim 2, and outputting a spreading code used for despreading the reception base band signal and a frame timing signal used in synchronization with the reception base band signal;

a matched filter block for performing a correlation calculation between the reception base band signal and the spreading code output from the first spreading code generation circuit;

a profile block for detecting a path based on the result of the correlation calculation in the matched filter block, and outputting the detection result;

a plurality of second spreading code generation circuits having the configuration of the spreading code generation circuit according to claim 2, provided for each path, supplied with a frame timing signal, and outputting a spreading code;

a plurality of correlator blocks each provided so as to constitute a pair with each of the second spreading code generation circuits, and performing a correlation calculation between the reception base band signal and the spreading code output from the second spreading code generation circuits and demodulation processing; and a controller deciding the synchronization timing of the reception base band signal and the detected path position based on the path detection result output from the profile block, outputting advance/delay information, symbol offset information or slot offset information to the first spreading code generation circuit based on the decision result, synchronizing the output of the spreading code with the synchronization timing of the reception base band signal, outputting phase copy information to all the second spreading code generation circuits, synchronizing the output of the spreading code with the synchronization timing of the reception base band signal, outputting advance/delay information, symbol offset information or slot offset information to the respective second spreading code generation circuits corresponding to the respective paths, and synchronizing the output of the spreading code with the synchronization timing of the respective paths.

10. A demodulation circuit which demodulate a reception base band signal of a spectrum spreading communication, said demodulation circuit comprising a first spreading code generation circuit having the configuration of the spreading code generation circuit according to claim 3, and outputting a spreading code used for despreading the reception base band signal and a frame timing signal used in synchronization with the reception base band signal;

a matched filter block for performing a correlation calculation between the reception base band signal and the spreading code output from the first spreading code generation circuit;

a profile block for detecting a path based on the result of the correlation calculation in the matched filter block, and outputting the detection result;

a plurality of second spreading code generation circuits having the configuration of the spreading code generation circuit according to claim 3, provided for each path, supplied with a frame timing signal, and outputting a spreading code;

a plurality of correlator blocks each provided so as to constitute a pair with each of the second spreading code generation circuits, and performing a correlation calculation between the reception base band signal and the spreading code output from the second spreading code generation circuits and demodulation processing; and a controller deciding the synchronization timing of the reception base band signal and the detected path position based on the path detection result output from the profile block, outputting advance/delay information, symbol offset information or slot offset information to the first spreading code generation circuit based on the decision result, synchronizing the output of the spreading code with the synchronization timing of the reception base band signal, outputting phase copy information to all the second spreading code generation circuits, synchronizing the output of the spreading code with the synchronization timing of the reception base band signal, outputting advance/delay information, symbol offset information or slot offset information to the respective second spreading code generation circuits corresponding to the respective paths, and synchronizing the output of the spreading code with the synchronization timing of the respective paths.

11. A demodulation circuit which demodulate a reception base band signal of a spectrum spreading communication, said demodulation circuit comprising a first spreading code generation circuit having the configuration of the spreading code generation circuit according to claim 4, and outputting a spreading code used for despreading the reception base band signal and a frame timing signal used in synchronization with the reception base band signal;

a matched filter block for performing a correlation calculation between the reception base band signal and the spreading code output from the first spreading code generation circuit;

a profile block for detecting a path based on the result of the correlation calculation in the matched filter block, and outputting the detection result;

a plurality of second spreading code generation circuits having the configuration of the spreading code generation circuit according to claim 4, provided for each path, supplied with a frame timing signal, and outputting a spreading code;

a plurality of correlator blocks each provided so as to constitute a pair with each of the second spreading code generation circuits, and performing a correlation calculation between the reception base band signal and the spreading code output from the second spreading code generation circuits and demodulation processing; and a controller deciding the synchronization timing of the reception base band signal and the detected path position based on the path detection result output from the profile block, outputting advance/delay information, symbol offset information or slot offset information to the first spreading code generation circuit based on the decision result, synchronizing the output of the spreading code with the synchronization timing of the reception base band signal, outputting phase copy information to all the second spreading code generation circuits, synchronizing the output of the spreading code with the synchronization timing of the reception base band signal, outputting advance/delay information, symbol offset information or slot offset information to the respective second spreading code generation circuits corresponding to the respective paths, and synchronizing the output of the spreading code with the synchronization timing of the respective paths.

12. A demodulation circuit which demodulate a reception base band signal of a spectrum spreading communication, said demodulation circuit comprising a first spreading code generation circuit having the configuration of the spreading code generation circuit according to claim 5, and outputting a spreading code used for despreading the reception base band signal and a frame timing signal used in synchronization with the reception base band signal;

a matched filter block for performing a correlation calculation between the reception base band signal and the spreading code output from the first spreading code generation circuit;

a profile block for detecting a path based on the result of the correlation calculation in the matched filter block, and outputting the detection result;

a plurality of second spreading code generation circuits having the configuration of the spreading code generation circuit according to claim 5, provided for each path, supplied with a frame timing signal, and outputting a spreading code;

a plurality of correlator blocks each provided so as to constitute a pair with each of the second spreading code generation circuits, and performing a correlation calculation between the reception base band signal and the spreading code output from the second spreading code generation circuits and demodulation processing; and a controller deciding the synchronization timing of the reception base band signal and the detected path position based on the path detection result output from the profile block, outputting advance/delay information, symbol offset information or slot offset information to the first spreading code generation circuit based on the decision result, synchronizing the output of the spreading code with the synchronization timing of the reception base band signal, outputting phase copy information to all the second spreading code generation circuits, synchronizing the output of the spreading code with the synchronization timing of the reception base band signal, outputting advance/delay information, symbol offset information or slot offset information to the respective second spreading code generation circuits corresponding to the respective paths, and synchronizing the output of the spreading code with the synchronization timing of the respective paths.

13. A demodulation circuit which demodulate a reception base band signal of a spectrum spreading communication, said demodulation circuit comprising a first spreading code generation circuit having the configuration of the spreading code generation circuit according to claim 6, and outputting a spreading code used for despreading the reception base band signal and a frame timing signal used in synchronization with the reception base band signal;

a matched filter block for performing a correlation calculation between the reception base band signal and the spreading code output from the first spreading code generation circuit;

a profile block for detecting a path based on the result of the correlation calculation in the matched filter block, and outputting the detection result;

a plurality of second spreading code generation circuits having the configuration of the spreading code generation circuit according to claim 6, provided for each path, supplied with a frame timing signal, and outputting a spreading code;

a plurality of correlator blocks each provided so as to constitute a pair with each of the second spreading code generation circuits, and performing a correlation calculation between the reception base band signal and the spreading code output from the second spreading code generation circuits and demodulation processing; and a controller deciding the synchronization timing of the reception base band signal and the detected path position based on the path detection result output from the profile block, outputting advance/delay information, symbol offset information or slot offset information to the first spreading code generation circuit based on the decision result, synchronizing the output of the spreading code with the synchronization timing of the reception base band signal, outputting phase copy information to all the second spreading code generation circuits, synchronizing the output of the spreading code with the synchronization timing of the reception base band signal, outputting advance/delay information, symbol offset information or slot offset information to the respective second spreading code generation circuits corresponding to the respective paths, and synchronizing the output of the spreading code with the synchronization timing of the respective paths.

14. A demodulation circuit which demodulate a reception base band signal of a spectrum spreading communication, said demodulation circuit comprising a first spreading code generation circuit having the configuration of the spreading code generation circuit according to claim 7, and outputting a spreading code used for despreading the reception base band signal and a frame timing signal used in synchronization with the reception base band signal;

a matched filter block for performing a correlation calculation between the reception base band signal and the spreading code output from the first spreading code generation circuit;

a profile block for detecting a path based on the result of the correlation calculation in the matched filter block, and outputting the detection result;

a plurality of second spreading code generation circuits having the configuration of the spreading code generation circuit according to claim 7, provided for each path, supplied with a frame timing signal, and outputting a spreading code;

a plurality of correlator blocks each provided so as to constitute a pair with each of the second spreading code generation circuits, and performing a correlation calculation between the reception base band signal and the spreading code output from the second spreading code generation circuits aid demodulation processing; and a controller deciding the synchronization timing of the reception base band signal and the detected path position based on the path detection result output from the profile block, outputting advance/delay information, symbol offset information or slot offset information to the first spreading code generation circuit based on the decision result, synchronizing the output of the spreading code with the synchronization timing of the reception base band signal, outputting phase copy information to all the second spreading code generation circuits, synchronizing the output of the spreading code with the synchronization timing of the reception base band signal, outputting advance/delay information, symbol offset information or slot offset information to the respective second spreading code generation circuits corresponding to the respective paths, and synchronizing the output of the spreading code with the synchronization timing of the respective paths.

* * * * *